(12) United States Patent
Söder et al.

(10) Patent No.: US 12,304,578 B2
(45) Date of Patent: May 20, 2025

(54) FIFTH WHEEL CONTROL ARRANGEMENTS FOR ARTICULATED VEHICLES

(71) Applicant: VOLVO TRUCK CORPORATION, Gothenburg (SE)

(72) Inventors: Richard Söder, Nödinge (SE); Lars Johansson, Sätila (SE); Olof Johansson, Hålanda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 848 days.

(21) Appl. No.: 17/440,087

(22) PCT Filed: Mar. 20, 2019

(86) PCT No.: PCT/EP2019/056931
§ 371 (c)(1),
(2) Date: Sep. 16, 2021

(87) PCT Pub. No.: WO2020/187406
PCT Pub. Date: Sep. 24, 2020

(65) Prior Publication Data
US 2022/0185397 A1    Jun. 16, 2022

(51) Int. Cl.
*B62D 53/06* (2006.01)
*B62D 53/08* (2006.01)

(52) U.S. Cl.
CPC ....... *B62D 53/068* (2013.01); *B62D 53/0835* (2013.01)

(58) Field of Classification Search
CPC ............ B62D 53/0835; B62D 53/0807; B62D 53/068; B62D 53/0821

USPC ............................... 180/433; 280/405.1, 432
See application file for complete search history.

(56) References Cited

U.S. PATENT DOCUMENTS

| | | |
|---|---|---|
| 2,612,381 A | 9/1952 | Bernard |
| 2,847,230 A | 8/1958 | Hendrickson et al. |
| 3,035,855 A | 5/1962 | Harris |
| 3,092,399 A | 6/1963 | Hair |

(Continued)

FOREIGN PATENT DOCUMENTS

| | | |
|---|---|---|
| CN | 1486259 A | 3/2004 |
| CN | 102407888 A | 4/2012 |

(Continued)

OTHER PUBLICATIONS

China Office Action dated Feb. 13, 2023 in corresponding China Patent Application No. 201980094327.0, 6 pages.

(Continued)

*Primary Examiner* — Christopher B Wehrly
(74) *Attorney, Agent, or Firm* — Venable LLP; Jeffri A. Kaminski

(57) ABSTRACT

A fifth wheel control arrangement (100) for an articulated vehicle comprising a fifth wheel having a biased hinge joint and an actuator (115) arranged to control a biasing force and/or a damping force of the biased hinge joint. The control arrangement comprises a control unit configured to automatically control the actuator in response to one or more input sensor signals associated with a current state of the articulated vehicle, to obtain a target wheel axle load of the articulated vehicle and/or to stabilize the articulated vehicle.

16 Claims, 4 Drawing Sheets

(56) References Cited

U.S. PATENT DOCUMENTS

| | | | | | |
|---|---|---|---|---|---|
| 4,226,437 | A | * | 10/1980 | Trudeau | B60G 17/033 |
| | | | | | 280/405.1 |
| 6,394,480 | B1 | * | 5/2002 | Brennan | B62D 53/085 |
| | | | | | 280/507 |
| 2008/0208424 | A1 | * | 8/2008 | Hartman | B60T 8/1708 |
| | | | | | 701/70 |
| 2009/0322048 | A1 | * | 12/2009 | Glavinic | B60G 17/0165 |
| | | | | | 701/37 |
| 2011/0068557 | A1 | * | 3/2011 | Brown | B62D 53/0814 |
| | | | | | 280/438.1 |
| 2018/0154888 | A1 | | 6/2018 | Buchner et al. | |

FOREIGN PATENT DOCUMENTS

| | | | | | |
|---|---|---|---|---|---|
| CN | 203974463 | U | | 12/2014 | |
| CN | 105264451 | A | | 1/2016 | |
| EP | 0470917 | A1 | | 2/1992 | |
| EP | 0471286 | A1 | | 2/1992 | |
| EP | 0512862 | A1 | | 11/1992 | |
| EP | 1655212 | A1 | | 5/2006 | |
| EP | 1912852 | B1 | * | 2/2010 | ........... B62D 53/068 |
| EP | 2258586 | A1 | | 12/2010 | |
| FR | 2489774 | A1 | | 3/1982 | |
| GB | 2372490 | A | | 8/2002 | |

OTHER PUBLICATIONS

International Search Report and Written Opinion dated Dec. 18, 2019 in corresponding International PCT Application No. PCT/EP2019/056931, 9 pages.

* cited by examiner

FIFTH WHEEL CONTROL ARRANGEMENTS FOR ARTICULATED VEHICLES

CROSS-REFERENCE TO RELATED APPLICATIONS

This application is a U.S. National Stage application of PCT/EP2019/056931, filed Mar. 20, 2019, and published on Sep. 24, 2020, as WO 2020/187406 A1, all of which is hereby incorporated by reference in its entirety.

TECHNICAL FIELD

The present disclosure relates to control arrangements and methods for automatically stabilizing articulated vehicles and also for adjusting wheel axle load on a semi-trailer vehicle comprising a fifth wheel arrangement.

The invention can be applied in cargo transport vehicles, such as towing truck and semi-trailer combinations for various types of cargo transport. Although the invention will be described mainly with respect to a semi-trailer vehicle, the invention is not restricted to this particular vehicle, but may also be used in other vehicles comprising fifth wheel arrangements, such as recreational vehicles.

BACKGROUND

A fifth wheel coupling arrangement provides a link between semi-trailer and towing truck or tractor vehicle. The towing truck comprises an often horseshoe-shaped table called the fifth wheel which has a slot configured to receive a kingpin attached to the semi-trailer. The semi-trailer then rests on the fifth wheel and the pulling force is transferred to the semi-trailer via the kingpin. As the towing truck turns, the downward-facing surface of the semi-trailer with the kingpin at the center rotates against the upward-facing surface of the fixed fifth wheel, which does not rotate.

The load on the semi-trailer has an impact on the load distribution on the front and rear wheel axles of the towing truck via the fifth wheel connection. It may be desired to adjust the wheel axle load distribution, i.e., to transfer some of the load from one axle to another axle in order to reach a more preferred wheel axle load distribution.

The overall stability properties of the articulated vehicle also depend at least in part on the fifth wheel arrangement. A fifth wheel arrangement which has a dampened hinge joint tends to increase vehicle stability properties.

U.S. Pat. No. 2,847,230 discloses a fifth wheel arrangement with a force distributing and dampening device disposed between the tractor frame and the fifth wheel assembly. By means of the force distributing and dampening device, the effect of the trailer load on the tractor can be shifted in part, e.g., from the tractor rear axle to the tractor front axle. A manual control interface is arranged in the truck cabin to control the force distributing and dampening device. An operator can, based on personal experience and manual inspection, adjust the wheel axle load distribution by manually operating the control interface to roughly reach a desired wheel axle load distribution. Adjusting the force distributing and dampening device to reach the preferred wheel axle load distribution may not be straight forward, especially for an inexperienced operator. Consequently, there is a need for a more simplified method of adjusting wheel axle loads.

SUMMARY

It is an object of the present disclosure to provide improved methods and control arrangements for adjusting wheel axle load. It is a further object of the present disclosure to provide methods and control arrangements for stabilizing articulated vehicles.

These objects are at least in part obtained by a fifth wheel control arrangement for an articulated vehicle. The control arrangement comprises a fifth wheel having a biased hinge joint and an actuator arranged to control a biasing force and/or a damping force of the biased hinge joint. Notably, the control arrangement comprises a control unit configured to automatically control the actuator in response to one or more input sensor signals associated with a current state of the articulated vehicle, to obtain a target wheel axle load of the articulated vehicle and/or to stabilize the articulated vehicle.

This way a driver of the vehicle or other vehicle operator need not manually configure the actuator to obtain a desired wheel axle load distribution, which is an advantage compared to the prior art discussed above. As will be described in the following, the control arrangement can be connected to a plurality of vehicle sensory inputs in order to automate control, thereby obtaining a more optimized wheel axle load distribution and a more stable vehicle depending on operating scenario and other external conditions. The target wheel axle pressure can be either manually configured depending on scenario, or it can be configured a-priori as an optimized wheel axle load suitable for, e.g., a particular vehicle.

The disclosed fifth wheel control arrangement allows for optimization of drive axle load, depending on use case, by redistribution of axle loads throughout the vehicle combination, for a fixed fifth wheel position, which is an advantage.

The disclosed control arrangements are particularly suitable for autonomous systems where no driver is present and can manually adjust the actuator.

According to some aspects, the wheel axle load is a drive wheel axle load and the control unit is arranged to control the biasing force in a first direction to increase the drive wheel axle load, and to control the biasing force in a second opposite direction to reduce the drive wheel axle load.

This way drive wheel axle load can be both increased and decreased as needed, which is an advantage. The drive wheel axle load can be automatically adjusted depending on vehicle operating scenario, which is an advantage.

According to other aspects, the fifth wheel control arrangement comprises a wheel axle load sensor. The control unit is arranged to obtain a current wheel axle load from the wheel axle load sensor, and to control the actuator to reduce a difference between the current wheel axle load and the target wheel axle load.

Consequently, wheel axle load distribution is automatically optimized to the desired target wheel axle load distribution. For instance, wheel axle load distribution will be automatically adjusted upon loading and unloading the vehicle to maintain the target wheel axle load.

According to some further aspects, the fifth wheel control arrangement comprises a tire slip sensor. The control unit is arranged to obtain an indication of tire slippage, and to control the actuator to increase the drive wheel axle load in response to obtaining the indication of tire slippage. This way, in case of insufficient traction due to, e.g., uneven trailer load or slippery road surface, the proposed control arrangement will temporarily increase drive axle load pressure, thereby increasing traction and reducing wheel skid. This temporary increase in drive axle load happens automatically without the driver having to manually control the system, which is an advantage since it allows the driver to focus on controlling the vehicle.

The disclosed fifth wheel control arrangement thus allows for control of the fifth wheel pitch motion in order to obtained optimized drive axle load, e.g. for the purpose of increased traction. This is especially beneficial in the case of unladen vehicle combinations in slippery road conditions. The technique may be especially relevant when reversing due to the negative trailer pitch that commonly occurs in this use case.

According to other aspects, the control unit is configurable in a tire change mode where the control unit is adapted to control the actuator to reduce a wheel axle load of a selected wheel axle, thereby simplifying tire change or other maintenance on the selected wheel axle, which is an advantage.

According to some aspects, the fifth wheel control arrangement comprises an articulation angle sensor and/or a vehicle tilt sensor arranged to register a current articulation angle and/or a current tilt angle of the articulated vehicle. The control unit is arranged to control the actuator to adjust the damping force of the biased hinge joint in response to the current articulation angle and/or the current tilt angle of the articulated vehicle.

This way the articulated vehicle can be automatically stabilized in scenarios where it otherwise may tip over due to issues with stability.

According to some such aspects, the control unit is arranged to determine a static scenario stability value of the vehicle, and to adjust the damping force of the biased hinge joint in response to the determined static scenario stability value.

Example scenarios where stability issues may arise include tipping of trailer load when the articulated vehicle is parked at a significant articulation angle, parking the articulated vehicle on a road surface with significant bank angle, and parking on unstable surfaces, such as a ferry or the like. It is an advantage that the vehicle is automatically stabilized in these and other potentially problematic scenarios.

According to aspects, the fifth wheel control arrangement comprises a motion sensor arranged to register a motion state of the articulated vehicle. The control unit is arranged to obtain a current motion state from the motion sensor, and to control the actuator to adjust the damping force of the biased hinge joint in response to the current motion state.

Thus, advantageously, the articulated vehicle can be automatically stabilized during critical events such as hard braking, negotiating turns at high velocity, and the like where stability may be an issue. This way, unwanted events such as jackknifing, tip-over, and the like can be prevented.

There are also disclosed herein control units, methods, computer programs, computer program products, systems, and vehicles associated with the above-mentioned advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
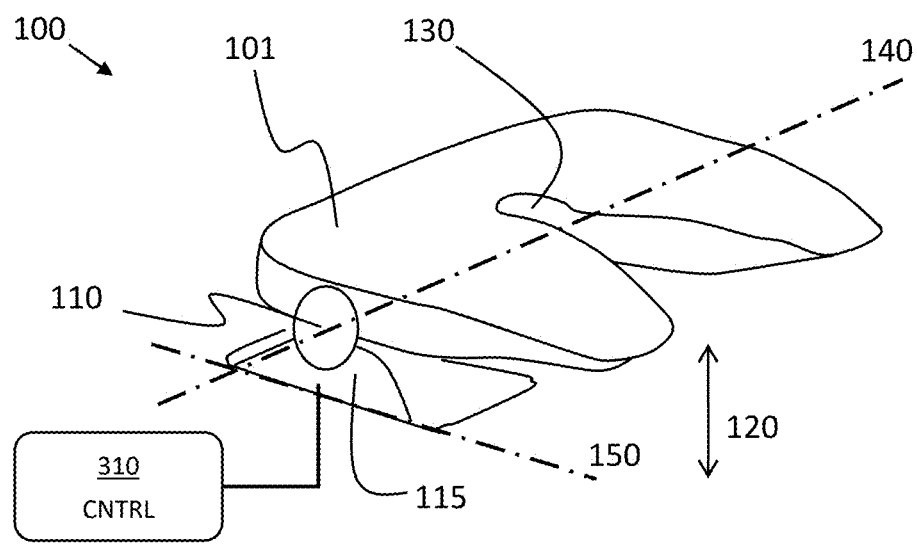
FIG. 1 schematically illustrates a fifth wheel arrangement.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

The connection between towing truck and semi-trailer plays an important part in determining the static and dynamic mechanical properties of an articulated vehicle. The present disclosure focuses on towing truck and semi-trailer combinations where the connection comprises a fifth wheel arrangement, such as illustrated in FIG. 1. It is known that, by controlling pitch angle of the fifth wheel, wheel axle load distribution can be adjusted. The present disclosure introduces automatic control arrangements for controlling pitch angle of fifth wheel arrangements. This automatic control is enabled by connecting the fifth wheel control arrangement to various vehicle sensor systems as described herein.

FIG. 1 illustrates a fifth wheel 101. The fifth wheel 101 provides a link between a towing truck and a semi-trailer by being arranged to receive a king-pin of the semi-trailer in a receiving slot 130. The fifth wheel 101 is arranged to pivot about a pivoting axis 140 by means of a hinge joint 110. This pivoting may also be referred to as fifth wheel pitch motion. The hinge joint 110 of the fifth wheel 101 is biased, which means that the fifth wheel strives for a certain pivoting angle with respect to, e.g., a mounting plane 150 of the fifth wheel arrangement. An actuator 115 is arranged to control the biasing force 120 of the fifth wheel arrangement. A control unit 310 is configured to control the biasing force 120.

An example of the actuator 115 was disclosed in U.S. Pat. No. 2,847,230. However, in general, actuators based on hydraulics, pneumatics, mechanical springs and the like can be used. Such actuators are known and will not be discussed in more detail herein.

The fifth wheel arrangement actuator 115 may also be arranged to control a damping force of the fifth wheel arrangement pivoting motion. By adjusting the damping force, vehicle stability properties can be adjusted. In an extreme case, the damping force is so strong as to lock the fifth wheel 101, thereby preventing any pivoting motion about the pivoting axis 140. Thus, herein, damping a fifth wheel pivoting motion may comprise locking the fifth wheel pivoting motion.

It is appreciated that the disclosed control arrangements and methods may control damping force separately from controlling the biasing force. Thus, there are disclosed herein arrangements and methods for controlling only biasing force, only damping force, or for controlling a combination of damping force and biasing force.

Figure 2:
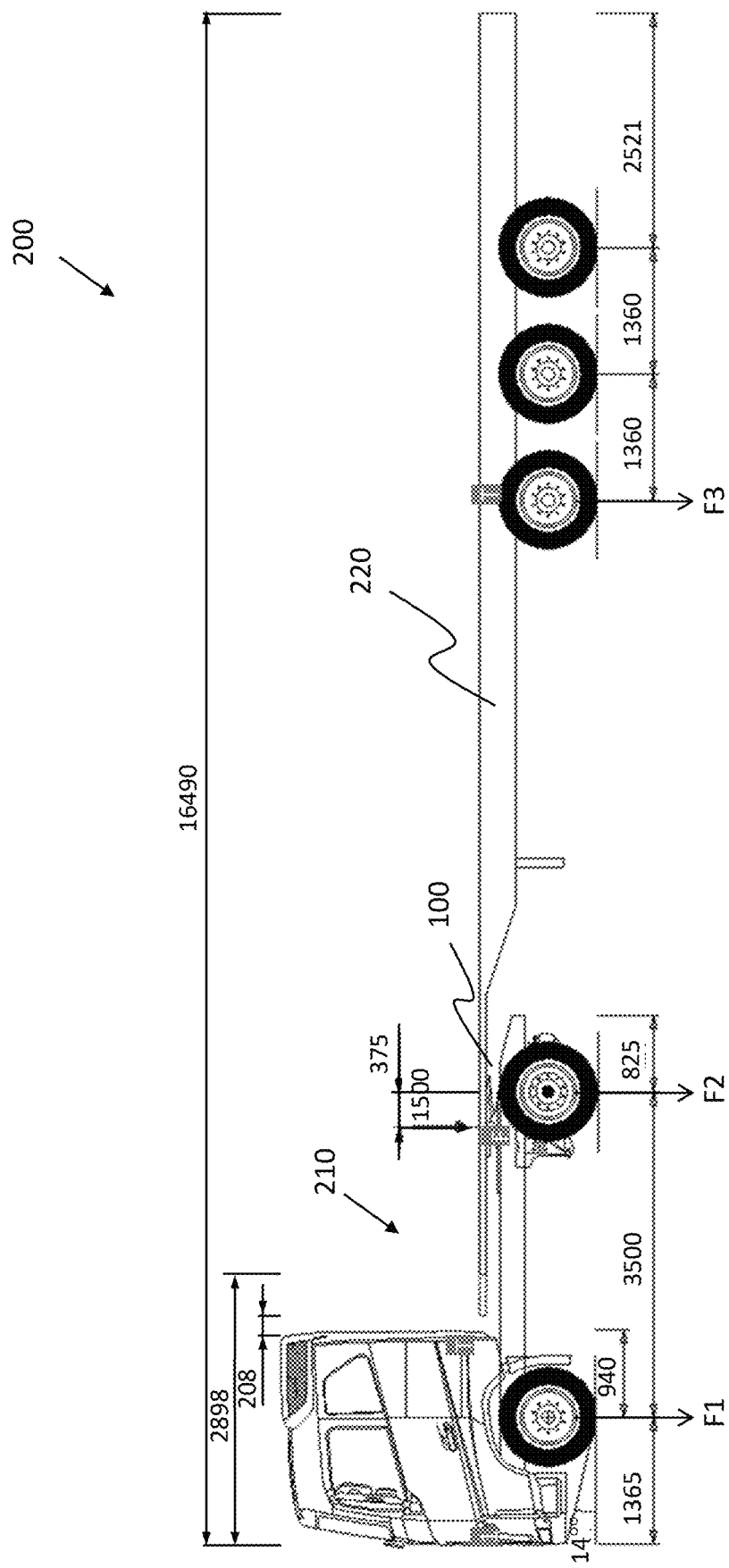
FIG. 2 illustrates a semi-trailer vehicle.

FIG. 2 illustrates an articulated vehicle 200 where the disclosed fifth wheel control arrangements 100, 300 may be used. A towing truck 210, sometimes also referred to as a tractor unit is coupled to a semi-trailer unit 220 via the fifth wheel arrangement 100. The illustrated towing truck 210 comprises two wheel axles. However, it is appreciated that towing trucks may comprise more than two wheel axles, where one or more wheel axles may be liftable wheel axles.

The wheel axle loads of the articulated vehicle 200 are shown as F1, F2, and F3. Often, F2 represents the drive wheel axle load. However, some towing trucks comprise more than one drive axle, and some towing trucks use the front-most wheel axle for drive, although this configuration is relatively rare.

It is appreciated that these wheel axle loads can be adjusted by controlling the biasing force 120 of the fifth wheel arrangement 100. This re-distribution of axle loads will be discussed and exemplified in more detail below in connection to FIGS. 4a and 4b.

It is appreciated that the biasing force 120 may need to be turned off during certain vehicle operations, such as during coupling between towing truck and semi-trailer. Otherwise coupling may not be possible due to the fifth wheel 101 having too large pitch angle. Thus, according to some aspects, the control unit 310 is configurable in a coupling mode associated with a zero biasing force during coupling of a towing truck 210 to a semi-trailer 260 of the articulated vehicle 200.

To summarize, FIGS. 1 and 2 illustrate a fifth wheel control arrangement 100 for an articulated vehicle 200. The control arrangement 100 comprises a fifth wheel 101 having a biased hinge joint 110 and an actuator 115 arranged to control a biasing force 120 and/or a damping force of the biased hinge joint 110. The control arrangement 100 comprises a control unit 310 configured to automatically control the actuator 115 in response to one or more input sensor signals associated with a current state of the articulated vehicle 200, to obtain a target wheel axle load F1, F2, F3 of the articulated vehicle and/or to stabilize the articulated vehicle 200.

Figure 3:
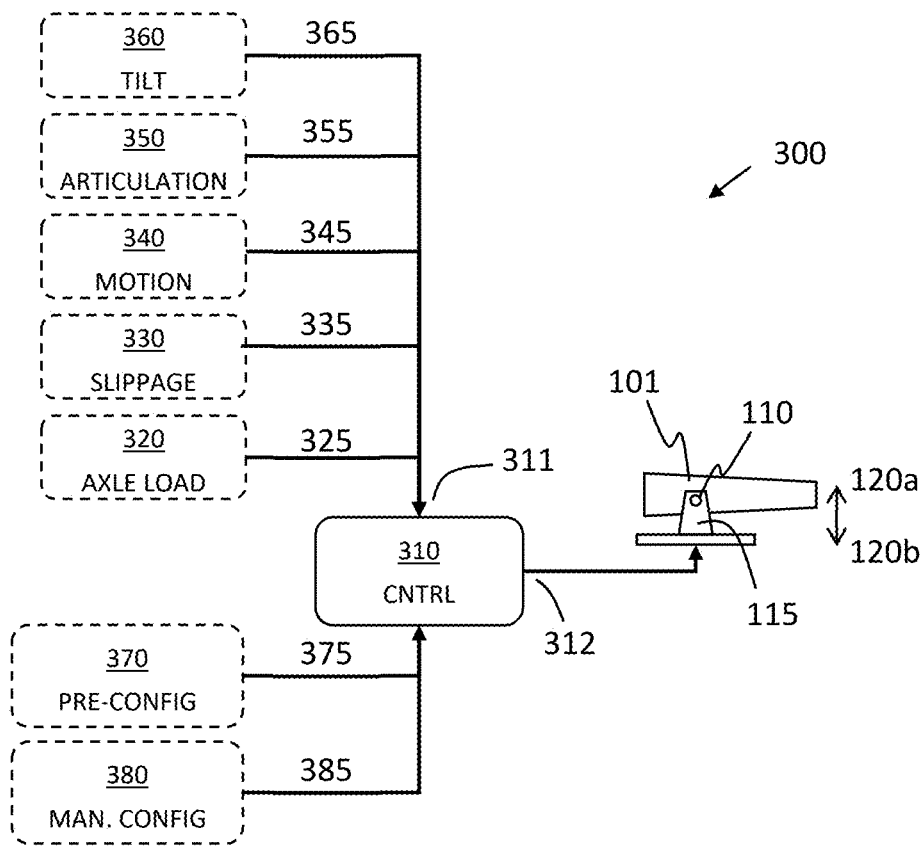
FIG. 3 illustrates a fifth wheel control arrangement.

FIG. 3 illustrates the fifth wheel control arrangement 100 in more detail. The control unit 310 comprises an output port 312 connected to the actuator 115 of the fifth wheel 101. Thus, the control unit 310 is arranged to automatically adjust the biasing force in upwards 120a, and downwards 120b directions. The control unit 310 is also arranged to control the damping force exerted by the actuator on the pivoting motion, or pitch motion, of the fifth wheel arrangement about the hinge joint 110. Hardware aspects and other details of the actual control unit 310 will be discussed in more detail below in connection to FIG. 7.

Figure 4A:
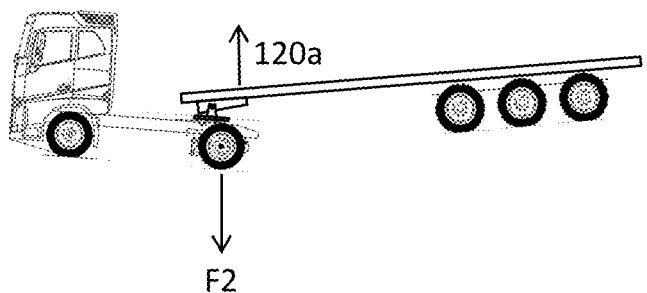
FIGS. 4a-4b schematically illustrate example load distributions.
Figure 4B:
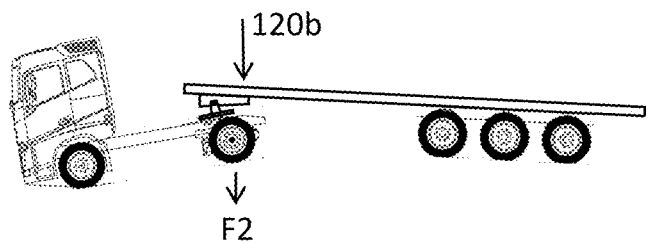

The effects of controlling the biasing force 120 of the biased hinge joint 110 are schematically illustrated in FIGS. 4a and 4b. Note that the illustration is exaggerated in order to more clearly show mechanical effects of the biasing force 120.

By controlling the biasing force in the upwards direction 120a, the articulated vehicle 200 'bends' like shown in FIG. 4a. This bending of the articulated vehicle 200 transfers load onto the towing truck drive axle, i.e., increases F2 compared to other wheel axle loads.

By controlling the biasing force in the downwards direction 120b, the opposite effect is obtained. In this case the articulated vehicle 'bends' in the other direction which transfers load away from the drive axle, i.e., reduces F2 compared to other wheel axle loads.

According to some aspects, the wheel axle load is a drive wheel axle load F2. The control unit 310 is then arranged to control the biasing force in a first or upwards direction 120a to increase the drive wheel axle load F2, and to control the biasing force in a second or downwards opposite direction 120b to reduce the drive wheel axle load F2.

The disclosed fifth wheel control arrangements 100, 300 can also be used to simplify tire change on the articulated vehicle. According to some aspects, the control unit 310 is configurable in a tire change mode where the control unit 310 is adapted to control the actuator 115 to reduce a wheel axle load of a selected wheel axle, thereby simplifying tire change or other maintenance on the selected wheel axle. For instance, in FIG. 4b, the axle load on the drive axle F2 has been reduced, which means that it will be easier to change a tire on this axle.

With reference again to FIG. 3, the fifth wheel control arrangement 300 comprises a number of optional sensors generating sensor inputs signals on which the automatic control of the biasing force and/or the damping force can be controlled. The sensor input signals allows for automatically adjusting biasing force and damping force to the current operating scenario of the vehicle, which is an advantage. In general, the sensor input signals allow for a feedback control system in which preferred target values may be specified which the control arrangement then controls the actuator to obtain. In general, target values may either be manually configured 380 depending on scenario by the driver, or it can be pre-configured 370.

For instance, the fifth wheel control arrangement 300 may comprise a wheel axle load sensor 320. This wheel axle load sensor may, e.g., be arranged in connection to a suspension system (not shown) of the towing truck and/or semi-trailer vehicle, or it can be some other type of wheel axle load sensor. The control unit 310 is arranged to obtain a current wheel axle load 325 from the wheel axle load sensor, and to control the actuator 115 to reduce a difference between the current wheel axle load 325 and the target wheel axle load F1, F2, F3.

This way, an unladen trailer will result in one setting for the biasing force 120. Then, if the trailer is laden, especially if the trailer is unevenly laden, the control unit 310 will detect a wheel axle load distribution that deviates from the preferred wheel axle load distribution (as pre-configured 370, or as manually configured 380) based on the sensor input 325.

The control unit 310 will then automatically respond to the changes in axle load by automatically adjusting the biasing force 120. Consequently, automatic control is facilitated without need for driver interaction, which is an advantage.

According to another example, the fifth wheel control arrangement 300 comprises a tire slip sensor 330. This sensor is arranged to detect when the wheels on the drive axle slip against the road surface. The tire slip sensor 330 may, e.g., be a part of an anti-skid system (not shown) of the towing truck. The control unit 310 is arranged to obtain an indication of tire slippage 335, and to control the actuator 115 to increase a drive wheel axle load F2 in response to obtaining the indication of tire slippage. Thus, traction is automatically increased which reduces wheel slip.

Figure 5A:
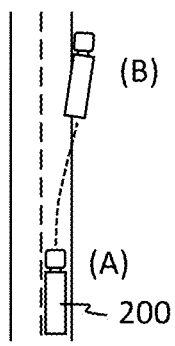
FIGS. 5a-5c schematically illustrate vehicle scenarios.

The fifth wheel control arrangement 100, 300 may also comprise a motion sensor 340, such as an inertial measurement unit (IMU), arranged to register a motion state of the articulated vehicle 200. The control unit 310 is then arranged to obtain a current motion state 345 from the motion sensor 340, and to control the actuator 115 to adjust the damping force of the biased hinge joint 110 in response to the current motion state. As mentioned above, stability properties of the articulated vehicle 200 can be adjusted by applying a damping force to the fifth wheel pivoting motion. In an extreme case, the damping can be so strong as to effectively lock the fifth wheel in a given pitch angle. The herein disclosed system may detect certain events such as hard braking and banking due to negotiating turns at high velocity by the motion sensor and control the damping force based on the detected events to increase vehicle stability when needed. For instance, vehicle stability may be improved during hard braking by significantly damping or even locking the fifth wheel pitch motion, as illustrated in FIG. 5a, where hard braking is applied at location (A) in order to bring the vehicle to a stop at location (B). This way jackknifing and vehicle tip-over may be prevented.

Figure 5B:
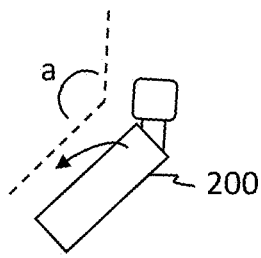
Figure 5C:
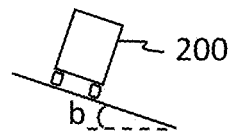

According to other examples, the articulated vehicle 200 may become unstable in certain static scenarios. One such scenario is illustrated in FIG. 5b, where the articulated vehicle 200 has been parked at an articulation angle a. The trailer load is then tipped, whereupon vehicle stability is affected. FIG. 5c illustrates another example scenario where the articulated vehicle has been parked at a banking angle, which may cause vehicle tip-over. In these cases, vehicle stability can be increased by applying a damping force to the fifth wheel pivoting motion, or even locking the fifth wheel 101 at a given pivoting angle. Thus, according to some aspects, the control unit 310 is arranged to determine a static scenario stability value of the vehicle, and to adjust the damping force of the biased hinge joint 110 in response to the determined static scenario stability value. For example, the fifth wheel control arrangement 300 may comprise an articulation angle sensor 350 and/or a vehicle tilt sensor 360 arranged to register a current articulation angle 355 and/or a current tilt angle 365 of the articulated vehicle 200. The control unit 310 is arranged to control the actuator 115 to adjust the damping force of the biased hinge joint 110 in response to the current articulation angle and/or the current tilt angle of the articulated vehicle 200.

Figure 6:
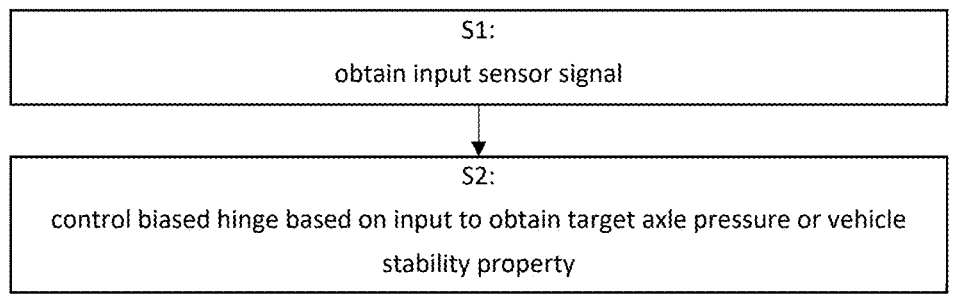
FIG. 6 is a flow chart illustrating methods.

FIG. 6 is a flow chart illustrating methods. The methods are those discussed above in connection to FIGS. 1-5. There is illustrated a method for obtaining a target wheel axle load F1, F2, F3 of an articulated vehicle 200 comprising a fifth wheel 101 having a biased hinged joint 110 controllable by an actuator 115 and a control arrangement 100, 300 as discussed above. The method comprises;

obtaining S1 one or more input sensor signals 325, 335, 345 associated with a current state of the articulated vehicle, and automatically controlling S2 the actuator 115 in response to the one or more input sensor signals 325, 335, 345 to obtain a target wheel axle load F1, F2, F3 of the towing truck 210 by adjusting a biasing force 120 of the biased hinge joint 110.

There is also illustrated a method for stabilizing an articulated vehicle 200 comprising a fifth wheel 101 having a biased hinged joint 110 controllable by an actuator 115 and a control arrangement 100, 300 as discussed above. The method comprises;

obtaining S1 one or more input sensor signals 325, 335, 345 associated with a current state of the articulated vehicle, and automatically controlling S2 the actuator 115 in response to the one or more input sensor signals 325, 335, 345 to stabilize the articulated vehicle 200 by adjusting a damping force of the biased hinge joint 110.

Figure 7:
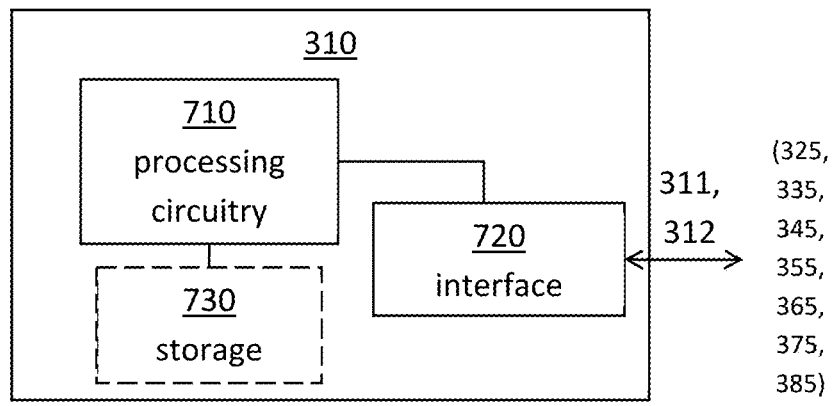
FIG. 7 schematically illustrates a control unit.

FIG. 7 schematically illustrates, in terms of a number of functional units, the components of a control unit 310 according to embodiments of the discussions herein. Processing circuitry 710 is provided using any combination of one or more of a suitable central processing unit CPU, multiprocessor, microcontroller, digital signal processor DSP, etc., capable of executing software instructions stored in a computer program product, e.g. in the form of a storage medium 730. The processing circuitry 710 may further be provided as at least one application specific integrated circuit ASIC, or field programmable gate array FPGA.

Particularly, the processing circuitry 710 is configured to cause the control unit 310 to perform a set of operations, or steps, such as the methods discussed in connection to FIG. 5. For example, the storage medium 730 may store the set of operations, and the processing circuitry 710 may be configured to retrieve the set of operations from the storage medium 730 to cause the control unit 310 to perform the set of operations. The set of operations may be provided as a set of executable instructions. Thus, the processing circuitry 710 is thereby arranged to execute methods as herein disclosed.

The storage medium 730 may also comprise persistent storage, which, for example, can be any single one or combination of magnetic memory, optical memory, solid state memory or even remotely mounted memory.

The control unit 310 may further comprise an interface 720 for communications with at least one external device, such as the antenna array comprising the phase controllers and the mechanically rotatable base plate. As such the interface 720 may comprise one or more transmitters and receivers, comprising analogue and digital components and a suitable number of ports for wireline or wireless communication.

The processing circuitry 710 controls the general operation of the control unit 310, e.g., by sending data and control signals to the interface 720 and the storage medium 730, by receiving data and reports from the interface 720, and by retrieving data and instructions from the storage medium 730. Other components, as well as the related functionality, of the control node are omitted in order not to obscure the concepts presented herein.

Consequently, there is disclosed herein a control unit 310 for controlling an articulated vehicle 200 fifth wheel 101 having a biased hinge joint 110 controllable by an actuator 115 arranged to be connected to the control unit 310. The control unit comprises one or more input ports 311 for receiving respective input sensor signals associated with a current state of the articulated vehicle, and an output port 312 for controlling an actuator 115 of the biased hinge joint 110. The control unit 310 is configured to automatically control the biased hinge joint 110 via the actuator 115 in response to the one or more input sensor signals to obtain a target wheel axle load F1, F2, F3 of the articulated vehicle 200 and/or to stabilize the articulated vehicle 200.

Figure 8:
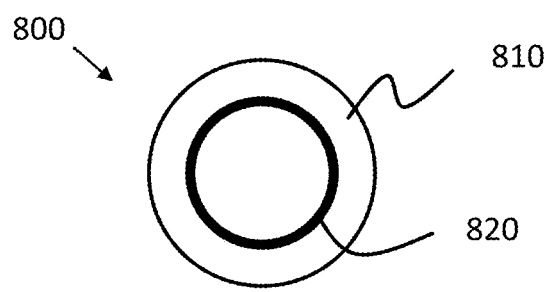
FIG. 8 shows an example computer program product.

FIG. 8 illustrates a computer readable medium 810 carrying a computer program comprising program code means 820 for performing the methods illustrated in FIG. 6, when said program product is run on a computer. The computer readable medium and the code means may together form a computer program product 800.

The invention claimed is:

1. A fifth wheel control arrangement for an articulated vehicle, comprising:
a fifth wheel having a biased hinge joint and an actuator arranged to control a biasing force and/or a damping force of the biased hinge joint, the control arrangement further comprises a control unit configured to automatically control the actuator in response to one or more input sensor signals associated with a current state of the articulated vehicle, to obtain a target wheel axle load of the articulated vehicle and/or to stabilize the articulated vehicle, and
an articulation angle sensor and/or a vehicle tilt angle sensor arranged to register a current articulation angle and/or a current tilt angle of the articulated vehicle, wherein the control unit is arranged to control the actuator to adjust the damping force of the biased hinge joint in response to the current articulation angle and/or the current tilt angle of the articulated vehicle.

2. The fifth wheel control arrangement according to claim 1, wherein the wheel axle load is a drive wheel axle load, wherein the control unit is arranged to control the biasing force in a first direction to increase the drive wheel axle load, and to control the biasing force in a second opposite direction to reduce the drive wheel axle load.

3. The fifth wheel control arrangement according to claim 1, comprising a wheel axle load sensor, wherein the control unit is arranged to obtain a current wheel axle load from the wheel axle load sensor, and to control the actuator to reduce a difference between the current wheel axle load and the target wheel axle load.

4. The fifth wheel control arrangement according to claim 3, wherein the wheel axle load sensor is arranged in connection to a suspension system of the articulated vehicle.

5. The fifth wheel control arrangement according to claim 1, comprising a tire slip sensor, wherein the control unit is arranged to obtain an indication of tire slippage, and to control the actuator to increase a drive wheel axle load in response to obtaining the indication of tire slippage.

6. The fifth wheel control arrangement according to claim 1, wherein the target wheel axle load is pre-configured.

7. The fifth wheel control arrangement according to claim 1, wherein the target wheel axle load is manually configurable.

8. The fifth wheel control arrangement according to claim 1, wherein the control unit is configurable in a tire change mode where the control unit is adapted to control the actuator to reduce a wheel axle load of a selected wheel axle, thereby simplifying tire change or other maintenance on the selected wheel axle.

9. The fifth wheel control arrangement according to claim 1, wherein the control unit is configurable in a coupling mode associated with a zero biasing force during coupling of a towing truck to a semi-trailer of the articulated vehicle.

10. The fifth wheel control arrangement according to claim 1, wherein the control unit is arranged to determine a static scenario stability value of the vehicle, and to adjust the damping force of the biased hinge joint in response to the determined static scenario stability value.

11. The fifth wheel control arrangement according to claim 1, wherein the fifth wheel control arrangement comprises a motion sensor arranged to register a motion state of the articulated vehicle, wherein the control unit is arranged to obtain a current motion state from the motion sensor, and to control the actuator to adjust the damping force of the biased hinge joint in response to the current motion state.

12. A control unit for controlling an articulated vehicle fifth wheel having a biased hinge joint controllable by an actuator arranged to be connected to the control unit, the control unit comprising one or more input ports for receiving respective input sensor signals from an articulation angle sensor and/or a vehicle tilt angle sensor associated with a current articulation angle and/or a current tilt angle of the articulated vehicle, and an output port for controlling an actuator of the biased hinge joint, the control unit being configured to automatically control the biased hinge joint via the actuator in response to the one or more input sensor signals to obtain a target wheel axle load of the articulated vehicle and/or to stabilize the articulated vehicle, and
wherein the control unit is arranged to control the actuator to adjust the damping force of the biased hinge joint in response to the current articulation angle and/or the current tilt angle of the articulated vehicle.

13. A vehicle comprising the control unit according to claim 12.

14. A method for obtaining a target wheel axle load of an articulated vehicle comprising a fifth wheel having a biased hinged joint controllable by an actuator and a control arrangement, the method comprising;
obtaining one or more input sensor signals from an articulation angle sensor and/or a vehicle tilt angle sensor associated with a current articulation angle and/or a current tilt angle of the articulated vehicle,
automatically controlling the actuator in response to the one or more input sensor signals to obtain a target wheel axle load of a towing truck by adjusting a damping force of the biased hinge joint in response to the current articulation angle and/or the current tilt angle of the articulated vehicle.

15. A method for stabilizing an articulated vehicle comprising a fifth wheel having a biased hinged joint controllable by an actuator and a control arrangement, the method comprising;
obtaining one or more input sensor signals from an articulation angle sensor and/or a vehicle tilt angle sensor associated with a current articulation angle and/or a current tilt angle of the articulated vehicle,
automatically controlling the actuator in response to the one or more input sensor signals to stabilize the articulated vehicle by adjusting a damping force of the biased hinge joint in response to the current articulation angle and/or the current tilt angle of the articulated vehicle.

16. A non-transitory computer readable medium carrying a computer program comprising program code for performing the method of claim 15, when said program code is run on a computer.

* * * * *